(12) United States Patent
Ruistola et al.

(10) Patent No.: US 10,848,597 B1
(45) Date of Patent: Nov. 24, 2020

(54) SYSTEM AND METHOD FOR MANAGING VIRTUAL REALITY SESSION TECHNICAL FIELD

(71) Applicant: Fake Production Oy, Helsinki (FI)

(72) Inventors: Juha Ruistola, Hyvinkää (FI); Aki Rossi, Helsinki (FI)

(73) Assignee: Fake Production Oy, Helsinki (FI)

( * ) Notice: Subject to any disclaimer, the term of this patent is extended or adjusted under 35 U.S.C. 154(b) by 0 days.

(21) Appl. No.: 16/398,523

(22) Filed: Apr. 30, 2019

(51) Int. Cl.
| | |
|---|---|
| *G06F 15/16* | (2006.01) |
| *H04L 29/06* | (2006.01) |
| *H04L 12/58* | (2006.01) |
| *H04L 12/18* | (2006.01) |
| *G06F 3/01* | (2006.01) |

(52) U.S. Cl.
CPC .............. *H04L 67/38* (2013.01); *G06F 3/011* (2013.01); *H04L 12/1881* (2013.01); *H04L 51/046* (2013.01); *H04L 65/1069* (2013.01); *H04L 65/80* (2013.01); *H04L 65/403* (2013.01)

(58) Field of Classification Search
CPC ..... H04L 67/38; H04L 65/1069; H04L 65/80; H04L 65/403; H04L 51/046; H04L 12/1881; G06F 3/011
See application file for complete search history.

(56) References Cited

U.S. PATENT DOCUMENTS

| | | | | |
|---|---|---|---|---|
| 2003/0216183 | A1* | 11/2003 | Danieli | A63F 13/12 463/42 |
| 2007/0191102 | A1* | 8/2007 | Coliz | A63F 13/795 463/42 |
| 2007/0298878 | A1* | 12/2007 | Short | A63F 13/63 463/31 |
| 2009/0062017 | A1* | 3/2009 | Kelly | H04L 67/38 463/42 |
| 2012/0270652 | A1* | 10/2012 | Kim | A63F 13/52 463/32 |
| 2017/0236329 | A1* | 8/2017 | Harvey | H04N 21/812 709/204 |
| 2018/0302345 | A1* | 10/2018 | Landowski | G06Q 10/107 |
| 2019/0068526 | A1* | 2/2019 | Xie | H04L 67/20 |
| 2019/0311341 | A1* | 10/2019 | Rice | G07G 1/0009 |
| 2019/0332400 | A1* | 10/2019 | Spoor | G06F 9/453 |
| 2020/0098192 | A1* | 3/2020 | Guerin | G06T 15/00 |

* cited by examiner

*Primary Examiner* — Richard G Keehn
(74) *Attorney, Agent, or Firm* — Ziegler IP Law Group, LLC

(57) ABSTRACT

Disclosed is a system for managing a virtual reality session for a scene. The system includes a scene state server for maintaining a shared state of the scene in the virtual reality session and a first messaging queue server having a communication interface. The communication interface is configured for a first set of user devices to establish a connection to the first messaging queue server to participate in the virtual reality session for user-interactions within the scene. The first messaging queue server is configured to receive a first message from a first user device of the first set of user devices and to further broadcast the first message to rest of the first set of user devices and to the scene state server, wherein the first message corresponds to a user action within the scene that is in the shared state at the first user device.

11 Claims, 5 Drawing Sheets

SYSTEM AND METHOD FOR MANAGING VIRTUAL REALITY SESSION TECHNICAL FIELD

TECHNICAL FIELD

The present disclosure relates generally to virtual reality technology; and more specifically, to systems and methods for managing a virtual reality session for a scene.

BACKGROUND

Virtual reality-based technologies are increasingly gaining popularity and has found applications in various fields such as gaming, education, healthcare, and so forth. Typically, virtual reality-based systems are used to create an interactive computer-simulated environment in which a user can immerse, navigate and interact. The interactive computer-simulated environment provides an illusion of a real or an imaginary environment.

In a multi-user virtual reality environment, where the users are geographically distributed, the challenge to manage an interactive session increases manifold. For example, a conventional interactive system which requires to read user input and render corresponding output frequently at short intervals for multiple users may be starved for data when the user producing data and the users consuming the data are geographically distributed. As a result of the geographic distribution, data latency is usually experienced and caused in a conventional system. Typically, in practice, software, hardware, and networking infrastructure increases such latency significantly. The problem of latency becomes pronounced as the number of users increases. For example, as the number of users (i.e., user-devices connected with each other in the system) increases, the probability to encounter poor network conditions, slow user connection speeds, slowly performing hardware, and similar sources of latency, increases manifold. Thus, managing the interactive session without an adverse impact of the latency on user experience interacting in the virtual reality environment becomes challenging.

Various network architectures are known, which may be selected, to manage the interactive session in the multi-user virtual reality environment. However, conventional systems and network arrangements are not suited to reliably manage the interactive session in the multi-user virtual reality environment to provide seamless immersion and user experience. For example, one of the conventional network arrangements, namely the peer-to-peer networking architecture is not centrally managed. In such network arrangement each device typically communicates with every other device in the network arrangement. Consequently, such communication pattern can cause a bandwidth problem in the network. Moreover, the consumer-level Internet connections typically used in day-to-day data communication provides little upstream bandwidth, making peer-to-peer networking architecture an unreliable model. Furthermore, in a peer-to-peer networking architecture it is not obvious as to which client should handle a newly joined user (i.e., client) and update the interactive session. Similarly, implementing a random host selection methodology in the network arrangement makes the network arrangement prone to losing an entire session in the multi-user virtual reality environment. Another conventional network arrangement that is centrally managed, namely the client-server networking architecture is bottlenecked with increasing data traffic and number of clients, and therefore is prone to increased latency. In yet another conventional network arrangement, namely the host-client networking architecture, a device has to act as central data manger. In such instance, the device performs two roles simultaneously which comparatively requires high processing capacity and increased bandwidth. Even with an increased processing capacity and bandwidth, the host-client networking architecture is prone to increased latency.

Therefore, in light of the foregoing discussion, there exists a need to overcome the aforementioned drawbacks associated with the system for managing a virtual reality session.

SUMMARY

The present disclosure seeks to provide a system for managing a virtual reality session for a scene. The present disclosure also seeks to provide a method for managing a virtual reality session for a scene. The present disclosure seeks to provide a solution to the existing problem of latency associated with managing virtual reality session. An aim of the present disclosure is to provide a solution that overcomes at least partially the problems encountered in prior art, and provides a user-friendly, reliable, low latency, and high-performance system for managing a virtual reality session, where the performance and user experience is not degraded with the increase in the number of devices connected to the system.

In an aspect, an embodiment of the present disclosure provides a system for managing a virtual reality session for a scene, the system comprising
  a scene state server for maintaining a shared state of the scene in the virtual reality session;
  a first messaging queue server having a communication interface,
    the communication interface configured for a first set of user devices to establish a connection to the first messaging queue server to participate in the virtual reality session for user-interactions within the scene, and
    the first messaging queue server is configured to receive a first message from a first user device of the first set of user devices and to further broadcast the first message to rest of the first set of user devices and to the scene state server, wherein the first message corresponds to a user action within the scene that is in the shared state at the first user device.

In another aspect, an embodiment of the present disclosure provides a method for managing a virtual reality session for a scene, the method comprising
  in a system that comprises a scene state server and a first messaging queue server having a communication interface:
    maintaining, by the scene state server, a shared state of the scene in the virtual reality session;
    utilizing the communication interface configured for a first set of user devices to establish a connection to the first messaging queue server to participate in the virtual reality session for user-interactions within the scene in the shared state, and
    receiving, by the first messaging queue server, a first message from a first user device of the first set of user devices and to further broadcast the first message to rest of the first set of user devices and to the scene state server, wherein the first message corresponds to a user action within the scene that is in the shared state at the first user device.

Embodiments of the present disclosure substantially eliminate or at least partially address the aforementioned problems in the prior art, and enables efficient and scalable management of a virtual reality session for a scene with low-latency.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
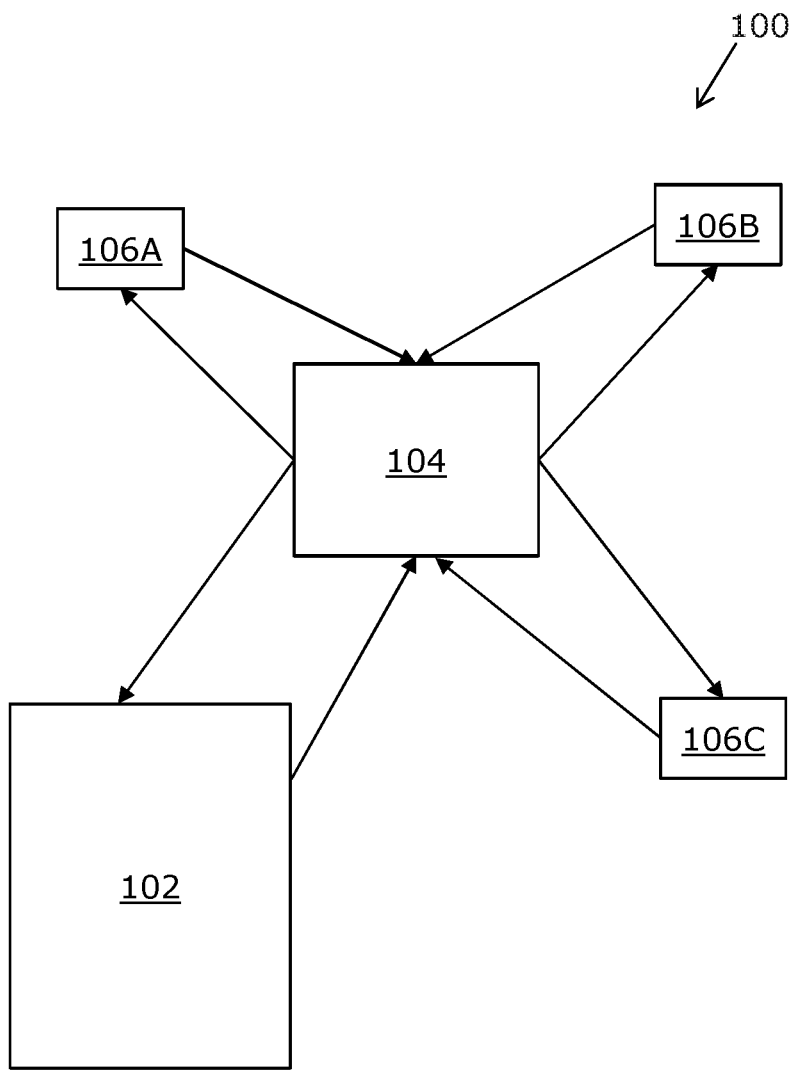
FIG. 1 is a block diagram of a system for managing a virtual reality session for a scene in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a system for managing a virtual reality session for a scene, the system comprising a scene state server for maintaining a shared state of the scene in the virtual reality session;

a first messaging queue server having a communication interface, the communication interface configured for a first set of user devices to establish a connection to the first messaging queue server to participate in the virtual reality session for user-interactions within the scene, and the first messaging queue server is configured to receive a first message from a first user device of the first set of user devices and to further broadcast the first message to rest of the first set of user devices and to the scene state server, wherein the first message corresponds to a user action within the scene that is in the shared state at the first user device.

In another aspect, an embodiment of the present disclosure provides a method for managing a virtual reality session for a scene, the method comprising in a system that comprises a scene state server and a first messaging queue server having a communication interface:

maintaining, by the scene state server, a shared state of the scene in the virtual reality session;

utilizing the communication interface configured for a first set of user devices to establish a connection to the first messaging queue server to participate in the virtual reality session for user-interactions within the scene in the shared state, and receiving, by the first messaging queue server, a first message from a first user device of the first set of user devices and to further broadcast the first message to rest of the first set of user devices and to the scene state server, wherein the first message corresponds to a user action within the scene that is in the shared state at the first user device.

The present disclosure provides the aforementioned system, and the aforementioned method for managing the virtual reality session for the scene. The system includes the scene state server and the first messaging queue server, wherein the scene state server is configured to maintain a shared state of the scene in the system, and the first messaging queue server is configured to maintain the communication within the user devices, namely the first set of user device and the scene state server. The system enables distributed management of data communication. The system is scalable, i.e., the system is configured to manage any influx of users during a virtual reality session. Furthermore, system is configured to manage the user devices and the communication therein without compromising the user experience, i.e. the system is configured to manage data transmittance in the virtual reality session without having increased latency. Moreover, the system remains responsive even if there is a slight delay caused by network communication.

The system is configured to manage the virtual reality session for the scene. Throughout the disclosure, the term "virtual reality session" refers to a period of time in which user-interactions within a scene are performed by multiple users using their respective user-devices of a plurality of user-devices. Examples of user devices may include, but are not limited to, a virtual reality headset, a wearable device, a handheld device (such as a smartphone, a tablet computer, or a laptop computer), a personal computer, and the like. Additionally, the user device includes a memory, a processor, a network interface, a display screen and the like. The scene is rendered at each user device of the plurality of user-devices.

The system enables multiple users to interact within the scene that is a shared across the plurality of user-devices. The scene refers to a virtual reality scene. Optionally, the scene is a virtual reality environment that is shared among the plurality of user-devices. The scene is represented by use of two-dimensional (2D) or three-dimensional (3D) computer graphics. In some embodiments, the scene is represented by use of 2D or 3D computer graphics, audio, haptic, or other sensory data, or a combination thereof. In accordance with an embodiment, the system is configured to manage a plurality of scenes concurrently. However, in such embodiment, one user at a user-device is able to interact with only one scene at a time.

The system comprises the scene state server for maintaining a shared state of the scene in the virtual reality session. The scene state server refers to a server configured to maintain the shared state of the scene in the virtual reality session. The scene state server comprises circuitry, interfaces, and/or logic capable of performing various computational tasks associated with maintaining the shared state of the scene in the virtual reality session. Examples of implementation of the scene state server include, but are not limited to an application server, a file server, a cloud server, a data server, or their combination. In an example, the scene state server may be a single hardware server, or a plurality of hardware servers operating in a parallel or distributed architecture to maintain the shared state of the scene in the virtual reality session. The scene state server is configured to communicate via a communication network with other programable components of the system, such as a messaging queue server. It will be appreciated that, the communication network refers to a communication channel that facilitates data communication between one or more components of the system, such as the messaging queue servers. The scene state server is configured to utilize one or more suitable protocol that supports communication including voice, video, data, or combinations thereof. Moreover, maintaining the shared state of the scene in the virtual reality session refers to storing and providing a representation of the same scene to be viewable across the plurality of user-devices. Optionally, maintaining a shared state of the scene in the virtual reality session refers to distributing data related to any change in the shared state of the scene.

According to an embodiment, the scene state server is configured to maintain the shared state of the scene and communicate the scene state to each newly joining or reconnecting user-device of the plurality of user-devices. It will be appreciated that the newly joining user device is a user device that accesses the virtual reality session for the first time and the reconnecting user-device is a user device that accesses the virtual reality session for a second time after having disconnected at least once in the virtual reality session. The scene state server acts as a final decision authority that determines on what is an absolute state of the scene. In operation, the scene state server unambiguously maintains the shared state of the scene. Thus, the risk of losing the entire virtual reality session by a given user device of the plurality of user devices is minimized.

According to an embodiment, the scene state server is configured to constantly maintain the shared state of the scene in the virtual reality session and acquire inputs provided by different user and update the shared state of the scene upon validating the inputs. Subsequently, the scene state server is configured to broadcast the shared state of the scene including the inputs provided by the user. It will be appreciated that the broadcast of the shared state of the scene is acceded by the messaging queue servers and the user devices.

The system comprises the first messaging queue server having the communication interface. The first messaging queue server refers to a server configured to receive a given message from a given user device and to further share the given message to other user devices and to the scene state server using the communication interface. The first messaging queue server includes an arrangement of physical or virtual computational entities capable of performing various computational tasks associated with efficient distribution of messages to the first set of user devices, the scene state server, and another messaging queue server, such as the second messaging queue server. Examples of implementation of the first messaging queue server may include, but are not limited to an application server, a cloud server, a data server, or their combination. In an example, the first messaging queue server may be a single hardware server or plurality of hardware servers operating in a parallel or distributed architecture. Optionally, the first messaging queue server is implemented as a computing hardware that can or does execute a server application. The communication interface refers to an assembly of one or more programable components in the first messaging queue server.

According to an embodiment, the communication interface is configured to provide the necessary mechanism for data transmission between the first messaging queue server and the scene state server, the first set of user devices, and/or the second messaging queue server, using various communication protocols. Examples of communication protocols may include, but are not limited to Transmission Control Protocol and Internet Protocol (TCP/IP), User Datagram Protocol (UDP), Hypertext Transfer Protocol (HTTP), File Transfer Protocol (FTP), ZigBee, EDGE, Frame Relay, Asynchronous Transfer Mode (ATM), Internetwork Packet Exchange (IPX), infrared (IR), IEEE 802.11, 802.16, any tunnelling protocol (e.g. IPsec, SSH), Long Term Evolution (LTE), Light Fidelity (Li-Fi), and/or other cellular communication protocols or Bluetooth (BT) communication protocols, including variants thereof. Furthermore, the communication interface can include various electronic components. Examples of the various electronic components may include, but are not limited to, an antenna, a radio frequency (RF) transceiver, one or more amplifiers, a tuner, one or more oscillators, a digital signal, a coder decoder (CODEC) chipset, or a subscriber identity module (SIM).

Optionally, the communication interface is implemented as a transceiver and is configured to enable the first messaging queue server to connect with the communication network that interconnects the first messaging queue server with other devices of the system, such as the scene state server, user device, and the second messaging queue server.

The communication interface is configured for the first set of user devices to establish the connection to the first messaging queue server to participate in the virtual reality session for user-interactions within the scene. Specifically, the communication interface of the first messaging queue server is configured to establish connections with each user device of the first set of user devices to enable sharing of messages therebetween. In an example, each user device of the first set of user devices may employ the network interface included therein to enable the sharing of messages via the communication network. In an embodiment, the user device includes a memory, a processor, a network interface, a display screen and the like. Moreover, each user device of the first set of user devices is configured to be communicatively coupled to the first messaging queue server.

Optionally, each user device of the first set of user devices includes a user interface to display the scene in the virtual reality session on the display screen of each user device of the first set of user devices. The user interface includes a structured set of user interface elements rendered on each of the user device. The user interface elements refer to visual objects that have a size and position in the user interface (UI). Examples of user interface elements includes (but are not limited to), text blocks, labels, text boxes, list boxes, lines, and image windows, dialog boxes, frames, panels, menus, buttons, icons, and the like. Optionally, the user interface (UI) used herein is a graphical user interface (GUI).

According to an embodiment, participating in the virtual reality session for user-interactions within the scene refers to user inputs provided by a user within the scene. In an example, the user input may be a touch input, a gesture input, a voice input, or an input sensed by sensors (such as motion sensors) associated with a user device, or an input received via a peripheral device, such as controllers, keyboard, or other input mechanisms. For example, a user may hold the user device and may move in a real world, and such movements may be tracked (e.g., by the motion sensors), followed by conversion of the tracked movement of the user device within the scene in the virtual reality session. In an example, the scene is a shared virtual reality gaming environment depicting a simulation of scene including two-dimensional (2D) or two-dimensional (3D) graphical objects such as a first graphical item, a second graphical item, a third graphical item, and a fourth graphical item. In such an instance, the user device may be a virtual reality headset that displays the scene in the virtual reality session. Furthermore, the user uses an input mechanism to interact with different graphical items within the scene. In an instance, a movement of the user device in a given direction, may result in a change in the scene. For example, the first graphical item may appear closer in the scene as the user wearing the user device moves. The initial representable state of the scene, along with any further changes to the state of the scene, is synchronized across the plurality of user devices. Furthermore, such movement in the scene refers to user-interactions within the scene and participating in the virtual reality session. Furthermore, a user refers to any entity including a person (i.e., human being) operating a given user device of the first set of user devices or a virtual personal assistant (e.g., an autonomous program or a bot) using a given user device of the first set of user devices.

Optionally, each user device of the first set of user devices is further configured to render the shared state of the scene, wherein the scene comprises a first set of representative objects that represents users of the first set of user devices. The rendering of the shared state of the scene in each user device of the first set of user devices refers to displaying the scene having similar representation of the scene at each user device of the first set of user devices, i.e. each of the user using the corresponding user device of the first set of user devices interacts within a given scene in the virtual reality session. Moreover, the first set of representative objects that represents users of the first set of user devices are graphical objects within the scene. In an example, a graphical object may be an avatar of the user who operates a given user device of the first set of user devices. In other words, the avatar may be a visual representation of the user using the user device. Optionally, the representative objects representing each of the users of the first set of users are positioned at a virtual distance from each other within the scene. For example, 'A', 'B' and 'C' are users represented by a representative object 'X', 'Y' and 'Z' in the scene. In such an example, the representative object 'X' may be positioned at the virtual distance of 1 meter from 'Y', and 2 meters from 'Z', furthermore, the representative object 'Y' may be positioned at the virtual distance of 1 meter from 'Z'. Optionally, the virtual distance in the scene represents physical distance between geographical location of the users, although such physical distance may be different than the virtual distance. For example, the virtual distance of 5 meters may represent 500 meters of physical distance between the geographical location of the users.

The first messaging queue server is configured to receive the first message from the first user device of the first set of user devices and to further broadcast the first message to rest of the first set of user devices and to the scene state server. The first message corresponds to the user action within the scene that is in the shared state at the first user device. The receiving of the message at the first messaging queue server from the first user device refers to the transmission of data describing a user action within the scene at the first user device. For example, the first message from the first user device may be a data describing a movement of a first representative object of the first set of representative objects within the scene. The first representative object represents the user of the first user device. In such example, a user action within the scene may be a motion path of the first representative object within the scene. The first messaging queue server is configured to relay the data describing user action at the first user device to each of the rest of the first set of user devices. For example, user devices of the first set of user devices may be 'L', 'M' and 'F', wherein 'L' is the first user device that is providing the first message received at the first messaging queue server. In such an example, the rest of the first set of user devices may be 'M' and 'F'. Furthermore, in such instance, the first messaging queue server is configured to relay the first message received therein to the user devices 'M' and 'F'.

Optionally, each message of a plurality of messages is indicative of a user action within the scene and comprises at least one of voice packets, a location coordinate of a representative object or a three-dimensional model in the scene, an orientation of the representative object or the three-dimensional model in the scene, motion information of the representative object or the three-dimensional, or a change in a representable state of the scene caused by the user action within the scene. The user action within the scene refers to a user input provided by a user using the corresponding user device to interact within the scene that is in the shared state. Moreover, the input provided by the user is to be construed as any information generated by the user device or movement of the user device to describe the activity of the user with respect to the virtual reality session.

In an example, a user may be using a user device such as a VR headset worn by the user to interact with the scene. In such example, a movement of the user may be considered as user action. Furthermore, in such instance, the head movement of the user may be considered as user action. Furthermore, the VR headset may include a microphone to acquire voice commands from the user. In such instance, a voice command or message or speech from the user may be considered as a user action. The user device is configured to generate a given message corresponding to a given user action performed by the user within the scene at the user device. Specifically, the given message corresponding to the given user action includes data that defines the user action performed by the user using the user device. For example, a user action performed by a user with respect to a scene including an avatar of the user and a graphical item may be picking up the graphical item visible in the scene. In such example, the user device may generate a message including data describing the user action of picking up the graphical item.

Optionally, the voice packets included in each of the message of the plurality of messages refers to packetized form of a voice signal of a given user of the user device. The voice signal is a user input captured by the user device via the input mechanism. In an example, a given user 'G' provides a user input via a corresponding user device to perform an action in the form of voice signal. In such example, the user device is configured to generate a packetized form of the voice signal, and transmit the voice packets to the messaging queue server, namely the first messaging queue server.

Optionally, the location coordinate of a representative object or a three-dimensional model in the scene indicates a current location of the representative object or the three-dimensional model within the scene. It will be appreciated that the three-dimensional model refers to a 3D computer graphic model that is used to represent a user or another animate or inanimate object within the scene that is different from the user. The orientation of the representative object or the three-dimensional model in the scene indicates an angular position of the representative object or the three-dimensional model with respect to a reference plane within the scene. In an example, the orientation of the representative object or the three-dimensional model may be the face orientation. In another example, the orientation of the representative object or the three-dimensional model may be an angular position with respect to the reference plane. In yet another example, the orientation of the representative object or the three-dimensional model may be relative orientation with respect to other objects visible in the scene.

Optionally, the motion information of the representative object or the three-dimensional model refers to data that defines movement of the representative object or the three-dimensional model from a first location to a second location within the scene. Similarly, the change in a representable state of the scene indicates any change in the scene caused by the user action within the scene. For example, in an exemplary shared scene that depicts a gaming environment, the user may move the user device that may result in movement of the representative object that represents the user. In such example, the message may include the data describing the motion information or the change in a representable state of the representative object that represents the user in the scene.

Optionally, the first messaging queue server is further configured to set a priority to a plurality of messages received from the first set of user devices, based on a data-type of data received in each message of the plurality of messages and a defined user role associated with a first set of representative objects that represents users of the first set of user devices. The data-type of data received in each message of the plurality of messages refers to the type of information included in the data received in each message. In an example, the data-type of data received in each message includes voice data (e.g. the voice packets), location data (e.g., the location coordinate of a representative object in the scene), orientation data (e.g., an orientation of the representative object in the scene), motion information of the representative object, or other data type that indicate a change in a representable state of the scene. In such example, the first messaging queue server may be configured to prioritise the message including the voice packets to be processed before the message including the orientation of the representative object in the scene. It will be appreciated that processing a given message by the first messaging queue server refers to relaying the message to the rest of the first set of user devices, the scene state server and the second messaging queue server.

Optionally, defining of the user role includes identifying the activities that is to be performed by the first set of representative objects that represents different users of the first set of user devices. For example, a representative object 'P' may be configured to perform activities such as 'Z', 'H', and 'D', in accordance to the role defined for the representative object 'P'. Furthermore, the defining of the user role includes assigning an importance factor to each of the first set of representative objects that represents users of the first set of user devices. In an example, the scene may represent an interior of a doctor's chamber. In such example, the first set of representative objects that represent the users may be 'A', 'B', and 'C' may be an avatar rendered as a 3D model of a doctor, a nurse and a doorman respectively. In such instance, the importance factor assigned to the user 'A' represented as 3D model of the doctor is more than the user 'B' represented as 3D model of the nurse and the message sent by the user 'C' represented as 3D model of the doorman. Furthermore, the importance factor assigned to the user 'B' represented as computer 3D graphic model of the nurse is more the message sent by the user 'C' represented as computer 3D graphic model of the doorman. In such instance, the message sent by the computer 3D graphic model of the doctor is prioritized in the virtual reality session.

Optionally, the first messaging queue server is further configured to determine a sequence of distribution of each message of the plurality of messages received from the first set of user devices to the rest of the first set of user devices and further to the second messaging queue server based on the set priority to the plurality of messages. Specifically, sequence of distribution of each message of the plurality of messages refers to a predefined order of communication of each message of the plurality of messages received from the first set of user devices to the rest of the first set of user devices and further to the second messaging queue server. The predefined order of communication is based on the priority to the plurality of messages, i.e. the data-type of data received in each message of the plurality of messages and a defined user role associated with the representative object on which a user action is performed to send a given message. For example, the set priority may be such that a message including a data type such as voice packets associated with a representative object 'S' is to be processed before another message including a data type such as a location data associated with a representative object '0'. In such instance, the first messaging queue server is configured to set a sequence of distribution of the messages in a manner where the message including the voice packets as data type is to be communicated before the message including the location data as the data type.

Optionally, each user device of the rest of the first set of user devices is further configured to determine whether the user action within the scene is valid based on the received first message. The received first message by the rest of the first set of user devices refers to the message including data related to the user action within the scene performed by the user in the shared state at the first user device. According to one embodiment, the first messaging queue server is configured to broadcast the defined user role associated with the first set of representative objects to each of the user device of the rest of the first set of user devices in the first message. In such instance, a given user device of the rest of the user device is configured to validate the user action further based on the user role. In an example, the first set of user devices may include the user devices 'A', 'B', and 'C'. In such instance, the user device 'A' may be the first user device and 'B' and 'C' may be the rest of the user device of the first set of user devices. In such instance, the received first message by the user devices 'B' and 'C' may describe the role of the first user device 'A', wherein the first user device 'A' may perform the activities 'Z', 'H', and 'D'. In such instance, if the user devices 'B' and 'C' receive the message corresponding to the user action of the first user device 'A' as describing the activities 'Z', 'H', and/or 'D' in such instance, the user devices 'B' and 'C' may consider the user action of the first user device 'A' as valid. In another instance, if the user devices 'B' and 'C' receive the message corresponding to the user action of the first user device 'A' as describing the activities 'I', 'O', and/or 'D' in such instance, the user devices 'B' and 'C' may consider the user action of the first user device 'A' as invalid. According to one embodiment, each user device of the rest of the first set of user devices is further configured to determine whether the user action within the scene is valid based on a predefined set of rules. If the user action conforms to the defined set of rules, the user action is considered valid. If the user action does not conform to the defined set of rules, the user action is considered invalid.

Optionally, each user device of the rest of the first set of user devices is further configured to generate a response to the user action within the scene based on the determination that the user action is valid, wherein the response is generated independent of a confirmation from the scene state server for the user action. The response to the user action within the scene refers to updating the shared state of the scene in the individual user devices of the rest of the first set of user devices. Furthermore, updating of the shared state of the scene in the individual user devices of the rest of the first set of user devices is performed locally without receiving message and/or input from the scene state server for maintaining a shared state of the scene. In other words, while the scene state server is the final authority on maintaining the absolute scene state, the user devices or the messaging queue servers do not wait for confirmation for each user action within the scene.

Optionally, the scene state server is further configured to determine whether the user action is valid. In an example, the scene state server is configured to validate the user action based on the defined user role associated with the representative objects corresponding to the user device. The scene state server is configured to record the user role defined for each of the representative objects corresponding to each of the user device. Moreover, the scene state server is configured to validate the user action based on the predefined set of rules. In an example, the user role of a given user device 'R' may define the representative object 'J' may perform the activity of opening a door in a scene describing a room including the door and a window. In such instance, if the user action describes the opening of the door in the room then, the scene state server is further configured to determine the user action as valid. In another instance, if the user action describes the opening of the window in the room then, the scene state server is further configured to determine the user action as invalid.

Optionally, the scene state server is further configured to update the user action within the scene in a scene state data structure based on the determination of the user action as valid, wherein the update is a new shared state of the scene. In an example, the scene state server identifies a user action such as opening a door in a scene, describing a room including a closed door and a closed window as valid. In such example, the scene state server may update the scene to include an open door and a closed window. Furthermore, the scene state server is configured to provide the messaging queue server, namely the first messaging queue server with the new shared state of the scene wherein the scene includes the open door and the closed window. The scene state data structure refers to a database that is configured to store representable data associated with the scene in the virtual reality session, such as the new shared state of the scene.

Optionally, the system further comprises a second messaging queue server configured to receive a second message from a second user device of a second set of user devices and to broadcast the second message to rest of the second set of user devices and to the first messaging queue server. The second messaging queue server is operatively similar to the first messaging queue server. For example, the second messaging queue server is an arrangement of physical or virtual computational entities capable of performing various computational tasks associated with managing the virtual reality session for the scene, such as communicating with the second set of user devices. Furthermore, the second messaging queue server communicates with the second set of user devices the via communication network. Additionally, the second messaging queue server is communicatively coupled to the first messaging queue server. The second messaging queue server broadcasts the second message to rest of the second set of user devices similarly as the first messaging queue server broadcasts the first message to rest of the first set of user devices. Moreover, the second messaging queue server communicates with the first messaging queue server via the communication network. The messages received from the second set of user devices at the second messaging queue server is transmitted to the first messaging queue server, and thereafter first messaging queue server transmits the messages from the second set of user devices to the first set of user devices and the scene state server.

Optionally, each user device of the second set of user devices is further configured to render the shared state of the scene wherein the scene comprises a second set of representative objects that represents users of the second set of user devices. The rendering of the shared state of the scene in each user device of the second set of user devices refers to displaying the shared state of the scene provided by the first messaging queue server when transmitted from the scene state server. The second set of representative objects that represents users of the second set of user devices is similar to the first set of representative objects that represents users of the first set of user devices. For example, the second set of representative objects that represents users of the second set of user devices are graphical objects within the scene. Moreover, the graphical objects may be an avatar of the user using the user device of the second set of user devices. Furthermore, the avatar may be a visual representation of user using the user device. The representative objects representing each of the users of the second set of users are positioned at a virtual distance from each other within the scene. Optionally, each representative object of the second set of representative objects is 2D model or a 3D model that is used by the user to represent itself within the scene. Optionally, some representative objects, 2D model, or 3D model within the scene may be controlled by non-human entities, such as machine learning (ML) or artificial intelligence (AI)-based algorithms or systems.

Optionally, the system is further configured to group the first set of representative objects in the scene into a first group and the second set of representative objects in the scene into a second group, based on a first predetermined distance between at least two representative objects within the scene, wherein the first set of representative objects in the first group are separated from the second set of representative objects within the scene based on a second predetermined distance within the scene between the first group and the second group. The first group refers to the group of representative objects in the scene that represent the users using the first set of user devices that are communicatively coupled to the first messaging queue server. Furthermore, the second group refers to the group of representative objects in the scene that represent the users using the second set of user devices that are communicatively coupled to the second messaging queue server.

Optionally, the first predetermined distance is a range within which the locations of the first set of representative objects lie within the scene, and accordingly are grouped in the first group. Similarly, the second set of representative objects lie within the first predetermined distance within the scene and accordingly are grouped in the second group. The second predetermined distance is the separation between the locations of the first group and the second group of representative objects. Additionally, the second predetermined distance is greater than the first predetermined distance in the scene. In an example, the first predetermined (virtual) distance within the scene may be 5 meters. The first set of representative objects may include representative objects 'A1', 'A2', and 'A3'. The location of representative object 'A1' is separated by 2 meters with the location of representative object 'A2'. The location of representative object 'A' is separated by 3 meters with 'A3'. Thus, the first set of representative objects 'A1', 'A2', and 'A3' lie within the range of 5 meters within the scene, and are this grouped within the first group. Similarly, the locations of representative objects of the second set of representative objects may lie within 5 meters, and thus grouped as second group within the scene in the example. In another example, the second predetermined distance in the scene may be 20 meters, that is the location of the first group may be virtually separated to the location of the second group by 20 meters within the scene. Location and distance are relative terms and in a virtual environment.

In an example, a scene of a virtual reality session may include a keynote presentation including representative objects, namely 'P', 'R', 'T', 'N', and 'Q'. In such example, the representative object 'P' may represent a presenter of the keynote presentation, and the representative objects 'R', 'T', 'N', and 'Q' represents audience. The presenter is considered a high priority data producer, and all users in the audience are considered low priority data producers in the virtual reality session. In the scene, the representative object 'R' and the representative object 'T' is positioned at 20 meters and 30 meters respectively from the representative object 'P', and the representative object 'N' and the representative object 'Q' is positioned at 40 meters and 45 meters respectively from the representative object 'P'. In such instance, a voice message from the representative object 'P' will be prioritized because of the user role of the representative object 'P' as the presenter and provided to the representative object 'R', 'T', 'N', and 'Q'. In other words, the voice message and other user action of the presenter is communicated to all participants in the audience in the virtual reality session at a full update frequency, but an audience member (e.g., 'R') is unlikely to consider other audience members (e.g., 'N' and 'Q') far away in the scene as significant, and thus the communication from audience members are set on low priority as compared to the presenter in the virtual reality session. Furthermore, in such example, a voice message from the representative object 'N' may be provided to representative object 'Q' before the representative object 'P', 'R', and 'T' as the user represented by the representative object 'Q' may be in vicinity to the user represented by the representative object 'N' in the scene, and thus is considered significant in communication of the voice message in the virtual reality session. Such communication enhances the user experience in the virtual reality session. In an example, the location and orientation data of low-priority representative objects (e.g., user avatars or other 2D or 3D models) may be propagated to neighbouring message queue servers at a reduced frequency, as compared to the location and orientation data of high-priority representative objects. Moreover, further propagation of the location and orientation data to more distant message queue servers may be controlled for the low-priority representative objects.

Optionally, the first set of user devices are communicatively coupled to the first messaging queue server and the second set of user devices are communicatively coupled to the second messaging queue server. The first set of user devices are communicatively coupled to the first messaging queue server and the second set of user devices are communicatively coupled to the second messaging queue server via the communication interface. Moreover, such arrangement enables communication of the plurality of messages within the first group using the first set of user devices and the second group using the second set of user devices, and between the first group and the second group. In an example, in a large-scale strategy gaming session may include two thousand users in one scene. In such example, the first group may include one thousand users using the first set of user devices, and the second group may include remaining one thousand users using the second set of user devices. In such example, a message sent by a user using a user device of the first set of user devices may be readily shared within the first set of user devices in the first group based on spatial locality.

Optionally, the communication of the plurality of message from the first set of user devices communicatively coupled to the first messaging queue server, or the second set of user devices are communicatively coupled to the second messaging queue server are prioritized based on spatial locality. Only certain changes to the shared state of the scene are synchronized among the user devices in the virtual reality session based on the user role and data type, and a priority is set to a message of the plurality of message to reflect changes in the shared state of the scene according to spatial locality. In an embodiment, the shared state of the scene is synchronized in an incremental manner as data is received from the communication network. Moreover, the state scene server is able to resolve potential conflicts when those are aroused when user perform user actions within the same scene in their respective user device locally while synchronization data that would render those actions invalid or impossible are still in-flight (i.e., still relayed over network) over the communication network. It will be appreciated that the potential conflict relates to an event where a given user action performed locally at user device is rendered invalid due to the synchronization of the scene state data structure.

Beneficially, such arrangement ensures increased reliability scalability and performance of the system and avoids bottlenecking in the system.

Optionally, the second messaging queue server is allocated to a user device of the first set of user devices when a first representative object of the first set of representative objects in the first group moves within the scene to lie within the first predetermined distance in the second group, and wherein the first representative object in the scene represents a user of the user device. In an example, a first representative object in the scene representing the user of a user device may be 'K', wherein the user device is associated to the first set of user devices communicatively coupled with the first messaging queue server. In such example, the first group and the second group may be separated by the second predetermined distance such as 20 meters. The first predetermined distance may be a range of 5 meters, in which representative objects lie are clustered in one group. The first representative object 'K' may change the position within the scene from the first group and move towards the second group so as to lie within the range of 5 meters in the second group. In this case, the user device associated with the first representative object 'K' is dynamically assigned to the second messaging queue server.

Optionally, the first messaging queue server is further configured to classify a user action within the scene in the virtual reality session as a user-interaction in an intra-group interaction mode or an inter-group interaction mode. The classification of a user action within the scene in the intra-group interaction mode refers to classification of user-interactions that occurs within a group and further identifying if the transmission of a given message is within the representative objects of one group, namely the first group or the second group. Similarly, the classification of a user action within the scene in the inter-group interaction mode refers to user-interactions in the scene between the first group and the second group (i.e., inter group interactions) and further identifying if the transmission of a given message is from a representative object of first group to the representing object of the second group.

Optionally, in the intra-group interaction mode, a first user-interaction within the first group is enabled via the first messaging queue server, a second user-interaction within the second group is enabled via the second messaging queue server based on the relay of the message that indicate the second user-interaction from the second messaging queue server to the first messaging queue server. Specifically, the user interactions in the scene among the first set of user devices in the first group are managed and further relayed by the first messaging queue server. The user interactions in the scene among the second set of user devices are managed and further communicated via the second messaging queue server. The user interactions in the scene among the second set of user devices is further relayed to the first messaging queue server from the second messaging queue server. Similarly, the user interactions in the scene among the first set of user devices in the first group is relayed by the first messaging queue server to rest of the user devices of the first set of user devices, the second messaging queue server, and the scene state server.

Optionally, in the inter-group interaction mode, a third user-interaction between the first group and the second group is enabled via a third messaging queue server. In certain scenarios, a user interaction in the scene by a given user device of first set of user devices in the first group affects a representative object of a user that represents a user device of a second set of user devices in the second group.

In such scenarios, the third messaging queue server manage such inter-group interactions, that is, the interactions between the first group and the second group. It will be appreciated that the third messaging queue server is similar to the first messaging queue server or the second messaging queue server. For example, the third messaging queue server is an arrangement of physical or virtual computational entities capable of performing various computational tasks associated with managing the virtual reality session for the scene, such as communicating a message.

The present disclosure also relates to the method as described above. Various embodiments and variants disclosed above apply mutatis mutandis to the method.

Optionally, the method, further comprises receiving, by a second messaging queue server of the system, a second message from a second user device of a second set of user devices and to broadcast the second message to rest of the second set of user devices and to the first messaging queue server.

Optionally, the method further comprises determining, by the scene state server, whether the user action is valid, and updating, by the scene state server, the user action within the scene in a scene state data structure based on the determination of the user action as valid, wherein the update is a new shared state of the scene that is synchronized across the first set of user devices and the second set of user devices.

Optionally, the method, further comprises determining, by each user device of the rest of the first set of user devices, whether the user action within the scene is valid based on the received first message, and generating, by each user device of the rest of the first set of user devices, a response to the user action within the scene based on the determination that the user action is valid, wherein the response is generated independent of a confirmation from the scene state server for the user action.

Optionally, the method comprises setting, by the first messaging queue server, a priority to a plurality of messages received from the first set of user devices, based on a data-type of data received in each message of the plurality of messages and a defined user role associated with a first set of representative objects that represents users of the first set of user devices.

Optionally, the method further comprises receiving, by a second messaging queue server, a second message from a second user device of a second set of user devices and to broadcast the second message to rest of the second set of user devices and to the first messaging queue server.

Optionally, the method comprises determining, by the first messaging queue server, a sequence of distribution of each message of the plurality of messages received from the first set of user devices to the rest of the first set of user devices and further to the second messaging queue server based on the set priority to the plurality of messages.

Optionally, the method wherein each message of the plurality of messages is indicative of a user action within the scene and comprises at least one of voice packets, a location coordinate of a representative object or a three-dimensional model in the scene, an orientation of the representative object or the three-dimensional model in the scene, motion information of the representative object or the three-dimensional, or a change in a representable state of the scene caused by the user action within the scene. The location coordinates can refer to a location in a virtual environment. The location coordinates can be used to calculate distance between representative objects in the virtual environment.

Optionally, the method comprises rendering, by each user device of the first set of user devices or the second set of user devices, the shared state of the scene, wherein the scene comprises one or more of: a first set of representative objects that represents users of the first set of user devices, a second set of representative objects that represents users of the second set of user devices, and a two or three dimensional model.

Optionally, the method comprises grouping the first set of representative objects in the scene into a first group and the second set of representative objects in the scene into a second group, based on a first predetermined distance between at least two representative objects within the scene, wherein the first set of representative objects in the first group are separated from the second set of representative objects within the scene based on a second predetermined distance within the scene between the first group and the second group. As an example this provides means to allocate a first messaging queue server to the first group and a second messaging queue server to the second group. This way communication between representative objects within a single group can be provided with less latency (or jitter) than between representative objects from different groups. This makes communication experience more pleasant and natural. It might be acceptable by users to have more latency (or jitter) of on communication if the representative objects are in the virtual environment further away from each other's than predetermined distance than if they are closer to each other's.

Optionally, the method wherein the first set of user devices are communicatively coupled to the first messaging queue server and the second set of user devices are communicatively coupled to the second messaging queue server, and wherein the second messaging queue server is allocated to a user device of the first set of user devices when a first representative object of the first set of representative objects in the first group moves within the scene to lie within the first predetermined distance in the second group, and wherein the first representative object in the scene represents a user of the user device.

Optionally, the method comprises classifying a user action within the scene in the virtual reality session as a user-interaction in an intra-group interaction mode or an inter-group interaction mode, wherein in the intra-group interaction mode, a first user-interaction within the first group is enabled via the first messaging queue server, a second user-interaction within the second group is enabled via the second messaging queue server based on a relay of a message that indicate the second user-interaction from the first messaging queue server to the second messaging queue server, and wherein in the inter-group interaction mode, a third user-interaction between the first group and the second group is enabled via a third messaging queue server.

DETAILED DESCRIPTION OF THE DRAWINGS

Referring to FIG. 1, there is shown a block diagram of a system 100 for managing a virtual reality session for a scene, in accordance with an embodiment of the present disclosure. As shown, the system comprises a scene state server 102 for maintaining a shared state of the scene in the virtual reality session. The system comprises a first messaging queue server 104, comprising a communication interface. The communication interface is configured for a first set of user devices 106A, 106B, and 106C to establish connection to the first messaging queue server 104 to participate in the virtual reality session for user-interactions within the scene.

Figure 2:
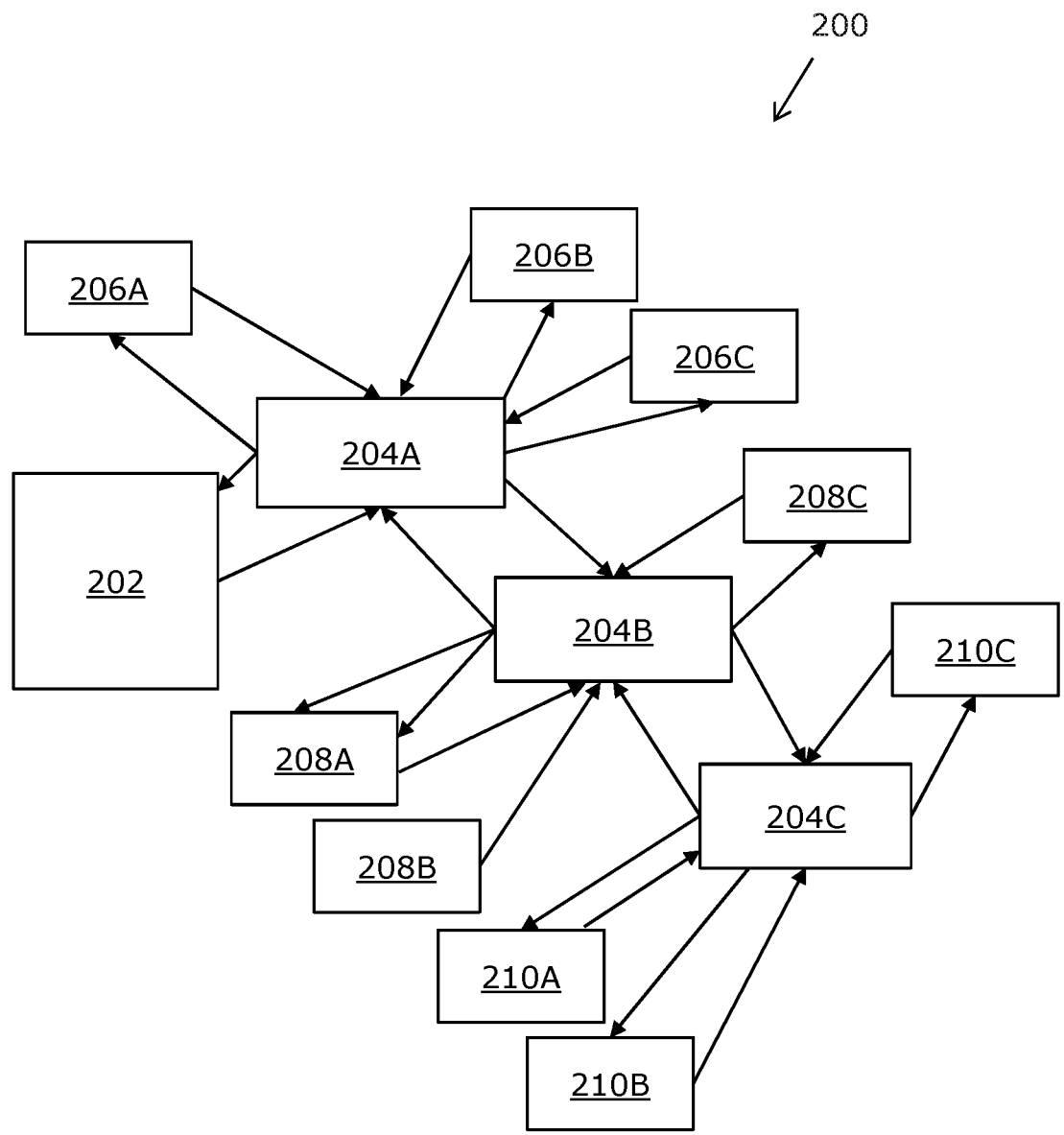
FIG. 2 is a block diagram of an exemplary implementation of the system of FIG. 1, illustrating multiple messaging queue servers and connections therein in accordance with an embodiment of the present disclosure.

Referring to FIG. 2, there is shown an exemplary implementation of the system 100 of FIG. 1, in accordance with an embodiment of the present disclosure. As shown, the system comprises a scene state server 202. The system further comprises a first messaging queue server 204A, a second messaging queue server 204B, and a third messaging queue server 204C. Each of the messaging queue server is connected to its own set of user devices. The first messaging queue server 204A is connected to a first set of user devices 206A, 206B, and 206C. The second messaging queue server 204B is connected to a second set of user devices 208A, 208B, and 208C. The third messaging queue server 204C is connected to a third set of user devices 210A, 210B, and 210C.

Figure 3:
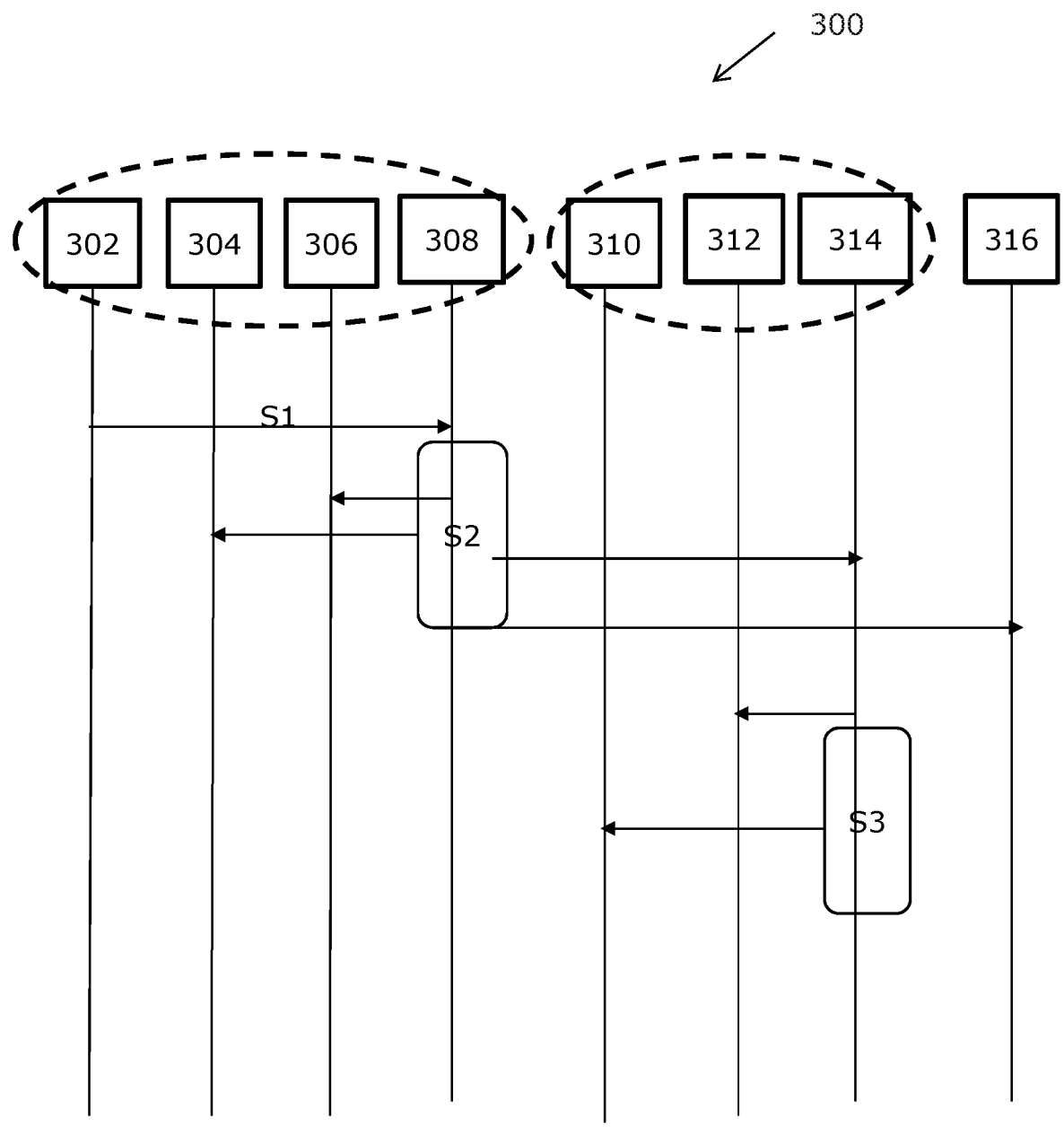
FIG. 3 is an exemplary sequence diagram of an exemplary implementation of the system of FIG. 1, in accordance with an embodiment of the present disclosure.

Referring to FIG. 3, there is shown an exemplary sequence diagram of an exemplary implementation of the system 100 of FIG. 1, in accordance with an embodiment of the present disclosure. As shown, the exemplary sequence diagram comprises a first set of user devices 302, 304, and 306 connected to a first messaging queue server 308 and a second set of user devices 310 and 312 connected to a second messaging queue server 314. The first messaging queue server 308 is connected to a scene state server 316. The first messaging queue server 308 and the second messaging queue server 314 are configured to communicate with each other. At step S1, the user device 302 sends a communication (communication is triggered for example, if the user performs a user action within the scene) to the first messaging queue server 308. At step S2, the first messaging queue server 308 broadcasts the communication to rest of the user devices (i.e., the user devices 304 and 306) in the first set of user devices and to the second messaging queue server 314 and the scene state server 316. At step S3, the second messaging queue server 314 further relays the communication to the second set of user devices 310 and 312.

Figure 4:
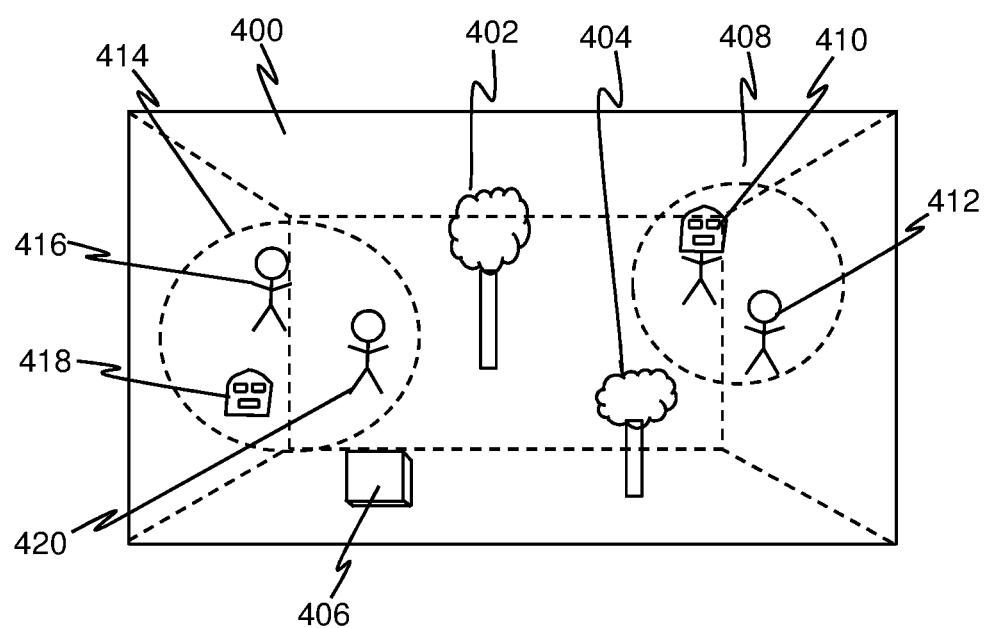
FIG. 4 illustrates an exemplary scenario for implementation of a system for managing a virtual reality session for a scene, in accordance with an embodiment of the present disclosure.

Referring to FIG. 4, there is shown an exemplary scenario for implementation of a system for managing a virtual reality session for a scene, in accordance with an embodiment of the present disclosure. There is shown an exemplary scene 400 that includes graphical elements 402, 404, and 406. In the exemplary scenario, the graphical elements 402, 404, and 406 may be 2D or 3D models. Moreover, the exemplary scene 400 includes a first group 408 comprising a first set of representative objects 410 and 412, and a second group 414 comprising a second set of representative objects 416, 418 and 420. In the exemplary scenario, the first set of representative objects 410 and 412 are virtual avatars that represents users of a first set of user devices in the first group 408. Similarly, the second set of representative objects 416, 418 and 420 are avatars that represents users of a second set of user devices in the second group 414. The users are able to interact with the exemplary scene 400 via respective user devices, such as the first set of user devices and the second set of user devices. Optionally, the exemplary scene 400 is rendered as a 3D image (e.g., a 3D virtual reality environment) at each user device, such as a head mounted display device, used by a user. Alternatively, the exemplary scene 400 is a virtual reality scene that is shared and rendered as a 2D view (e.g., a 2D virtual reality environment) at each user device, such as a head mounted display device, used by a given user. As illustrated in the FIG. 4 the representative objects of the first group 408 and the representative objects of the second group 414 are separated in a virtual environment with a distance (as the location coordinates of the representative objects in the scene define a distance in a virtual space). According to an example embodiment thus the representative objects in the first group 408 are configured to use the first messaging queue server and the representative objects in the second group 414 are configured to use the second messaging queue server.

Figure 5:
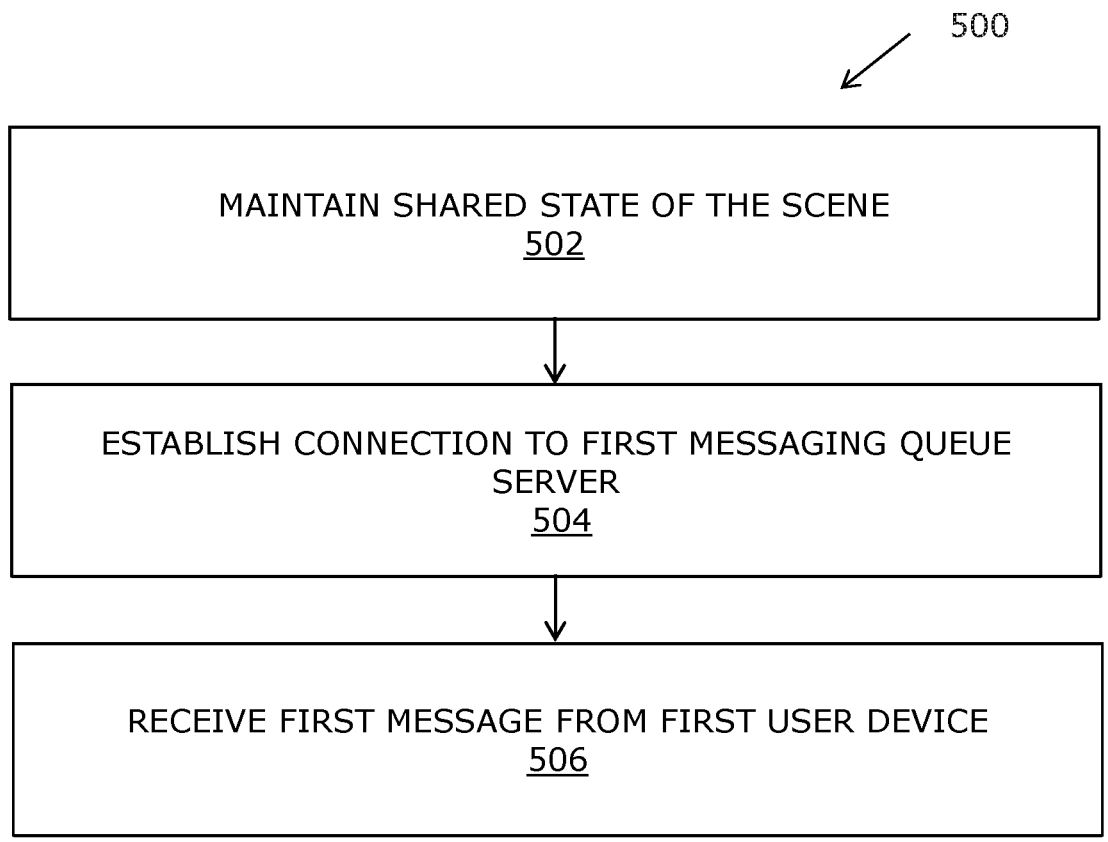
FIG. 5 is a flow chart that depicts a method for managing a virtual reality session for a scene, in accordance with an embodiment of the present disclosure.

Referring to FIG. 5, illustrated are steps of a method 500 for managing a virtual reality session for a scene, in accordance with an embodiment of the present disclosure. At a step 502, a shared state of the scene is maintained by the scene state server in the virtual reality session. At a step 504, a communication interface is utilized by a first set of user devices to establish a connection to the first messaging queue server to participate in the virtual reality session for user-interactions within the scene in the shared state. At a step 506, a first message from a first user device of the first set of user devices is received by the first messaging queue server and further broadcast to rest of the first set of user devices and to the scene state server, wherein the first message corresponds to a user action within the scene that is in the shared state at the first user device.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A system for managing a virtual reality session for a scene, the system comprising non-transitory machine readable instruction, which when executed by the system are configured to enable the system to provide;
   a scene state server for maintaining a shared state of the scene in the virtual reality session;
   a first messaging queue server having a communication interface,
      the communication interface configured for a first set of user devices to establish a connection to the first messaging queue server to participate in the virtual reality session for user-interactions within the scene,
      the first messaging queue server is configured to receive a first message from a first user device of the first set of user devices and to further broadcast the first message to rest of the first set of user devices and to the scene state server, wherein the first message corresponds to a user action within the scene that is in the shared state at the first user device; and
   a second messaging queue server configure to receive a second message from a second user device of a second set of user devices and to broadcast the second message to rest of the second set of user devices and to the first messaging queue server;
   wherein each user device of first set of user devices or the second set of devices is further configured to render the shared state of the scene, wherein the scene comprises one or more of: a first set of representative objected that represents users of the first set of user devices, a second set of representative objects that represents a users of the second set of user devices, and a two or three dimensional model;
   wherein execution of the non-transitory machine readable instructions by the system is further configured to cause the system to group the first set of representative objects in the scene into a first group and the second set of representative objects in the scene into a second group, based on a first predetermined distance between at least two representative objects within the scene, wherein the first set of representative objects in the first group are separated from the second set of representative objects within the scene based on a second predetermined distance within the scene between the first group and the second group;
   wherein the first set of user devices are communicatively coupled to the first messaging queue server and the second set of user devices are communicatively coupled to the second messaging queue server, and
   wherein the second messaging queue server is allocated to a user device of the first set of user devices when a first representative object of the first set of representative objects in the first group moves within the scene to lie within the first predetermined distance in the second group, and wherein the first representative object in the scene represents a user of the user device.

2. The system according to claim 1, wherein the scene state server is further configured to:
   determine whether the user action is valid, and
   update the user action within the scene in a scene state data structure based on the determination of the user action as valid, wherein the update is a new shared state of the scene.

3. The system according to claim 1, wherein each user device of the rest of the first set of user devices is further configured to:
   determine whether the user action within the scene is valid based on the received first message, and
   generate a response to the user action within the scene based on the determination that the user action is valid, wherein the response is generated independent of a confirmation from the scene state server for the user action.

4. The system according to claim 1, wherein the first messaging queue server is further configured to set a priority to a plurality of messages received from the first set of user devices, based on a data-type of data received in each message of the plurality of messages and a defined user role associated with a first set of representative objects that represents users of the first set of user devices.

5. The system according to claim 4, wherein the first messaging queue server is further configured to determine a sequence of distribution of each message of the plurality of messages received from the first set of user devices to the rest of the first set of user devices and further to the second messaging queue server based on the set priority to the plurality of messages.

6. The system according to claim 5, wherein each message of the plurality of messages is indicative of a user action within the scene and comprises at least one of voice packets, a location coordinate of a representative object or a three-dimensional model in the scene, an orientation of the representative object or the three-dimensional model in the scene, motion information of the representative object or the three-dimensional, or a change in a representable state of the scene caused by the user action within the scene.

7. The system according to claim 1, wherein the first messaging queue server is further configured to classify a user action within the scene in the virtual reality session as a user-interaction in an intra-group interaction mode or an inter-group interaction mode,
   wherein in the intra-group interaction mode, a first user-interaction within the first group is enabled via the first messaging queue server, a second user-interaction within the second group is enabled via the second messaging queue server based on a relay of a message that indicate the second user-interaction from the second messaging queue server to the first messaging queue server, and wherein in the inter-group interaction mode, a third user-interaction between the first group and the second group is enabled via a third messaging queue server.

8. A method for managing a virtual reality session for a scene, the method comprising:

in a system that comprises a scene state server and a first messaging queue server having a communication interface:

maintaining, by the scene state server, a shared state of the scene in the virtual reality session;

utilizing the communication interface configured for a first set of user devices to establish a connection to the first messaging queue server to participate in the virtual reality session for user-interactions within the scene in the shared state, and receiving, by the first messaging queue server, a first message from a first user device of the first set of user devices and to further broadcast the first message to rest of the first set of user devices and to the scene state server, wherein the first message corresponds to a user action within the scene that is in the shared state at the first user device, wherein the method further comprises:

receiving, by a second messaging queue server of the system, a second message from a second user device of a second set of user devices and to broadcast the second message to rest of the second set of user devices and to the first massaging queue server;

determining, by the first messaging queue server, a sequence of distribution of each message of plurality of messages received from the first set of user devices to the rest of the first set of user devices and further to the second messaging queue server based on the set priority to the plurality of messages;

rendering, by each user device of the first set of user devices or the second set of user devices, the shared state of the scene, wherein the scene comprises one or more of: a first set of representative objects that represents users of the first set of user devices, a second set of representative objects that represents users of the second set of user devices, and a two or three dimensional model;

grouping the first set of representative objects in the scene into a first group and the second set of representative objects in the scene into a second group, based on a first predetermined distance between at least two representative objects within the scene, wherein the first set of representative objects in the first group are separated from second set of representative objects within the scene based on a second predetermined distance within the scene between the first group and second group; and classifying a user action within the scene in the virtual reality session as a user-interaction in an intra-group interaction mode or an inter-group interaction mode, wherein in the intra-group interaction mode, a first user-interaction within the first group is enabled via the first messaging queue server, a second user-interaction within the second group is enabled via the second messaging queue server based on a relay of a message that indicate the second user-interaction from the second messaging queue server to the first messaging queue server, and wherein in the inter-group interaction mode, a third user-interaction between the first group and the second group is enabled via a third messaging queue server.

9. The method according to claim 8, further comprising determining, by the scene state server, whether the user action is valid, and updating, by the scene state server, the user action within the scene in a scene state data structure based on the determination of the user action as valid, wherein the update is a new shared state of the scene that is synchronized across the first set of user devices and the second set of user devices.

10. The method according to claim 9, further comprising determining, by each user device of the rest of the first set of user devices, whether the user action within the scene is valid based on the received first message, and generating, by each user device of the rest of the first set of user devices, a response to the user action within the scene based on the determination that the user action is valid, wherein the response is generated independent of a confirmation from the scene state server for the user action.

11. The method according to claim 8, further comprising setting, by the first messaging queue server, a priority to a plurality of messages received from the first set of user devices, based on a data-type of data received in each message of the plurality of messages and a defined user role associated with a first set of representative objects that represents users of the first set of user devices.

* * * * *